(12) United States Patent
Stephan et al.

(10) Patent No.: US 6,227,491 B1
(45) Date of Patent: *May 8, 2001

(54) WINDOW UNIT FOR AIRCRAFT CABINS

(75) Inventors: Walter A. Stephan, St. Martin; Hermann Filsegger, Ried im Innkreis, both of (AT)

(73) Assignee: Fischer Advanced Composite Components Gesellschaft, Ried im Innkreis (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,716

(22) Filed: Jul. 27, 1998

(30) Foreign Application Priority Data

Jul. 25, 1997 (AT) .................................................. 1275/97

(51) Int. Cl.$^7$ ........................................................ B64C 1/14
(52) U.S. Cl. ............................ 244/129.3; 49/501; 49/502
(58) Field of Search ................................. 244/129.3, 119, 244/129.1; 52/202, 208, 213; 296/148, 149; 49/501, 504

(56) References Cited

U.S. PATENT DOCUMENTS

| | | | |
|---|---|---|---|
| 2,784,926 | * 3/1957 | Bonza et al. | 244/129.3 |
| 3,691,686 | * 9/1972 | Donegan | 49/56 |
| 3,906,669 | * 9/1975 | Vorguitch | 49/372 |
| 4,268,995 | * 5/1981 | Villa | 49/87 |
| 4,364,533 | * 12/1982 | Pompei et al. | 244/129.3 |
| 4,541,595 | * 9/1985 | Fiala et al. | 244/129.3 |
| 4,611,850 | * 9/1986 | Fujikawa | 296/201 |
| 4,703,973 | * 11/1987 | Fujikawa | 296/201 |
| 5,230,376 | * 7/1993 | Woodruff et al. | 160/90 |
| 5,271,581 | * 12/1993 | Irish | 244/129.3 |
| 5,397,080 | 3/1995 | Berg | 244/129.2 |
| 5,467,943 | * 11/1995 | Umeda | 244/129.3 |
| 5,816,307 | * 10/1998 | Sanz | 244/129.3 |
| 5,921,029 | * 7/1999 | Stukerjurgen | 49/501 |

FOREIGN PATENT DOCUMENTS 24 26 136    5/1975   (DE) .

* cited by examiner

*Primary Examiner*—Charles T. Jordan
*Assistant Examiner*—Tien Dinh
(74) *Attorney, Agent, or Firm*—Jacobson, Price, Holman & Stern, PLLC (57) ABSTRACT

The invention relates to a window unit W for aircraft cabins, comprising an outer window frame 1, an inner window frame 3, a window pane 2 lying between them, and possibly having a sun-visor 4, a roller blind 34 or the like arranged between the inner window frame 3 and a possible covering frame 5, the window unit W being insertable into the opening 7 in a side-wall panel 6 or the like in the aircraft cabin. In order to make it possible for the window unit W to be rapidly and simply installed and removed, the invention makes provision for the window unit W to have a centering device and at least two snap fastenings 13, advantageously with locking devices, to detachably connect it to the side-wall panel 6, or to components connected thereto, the side-wall panel 6, or components connected thereto, having any necessary mating parts for the centering device for the snap fastenings 13. The centering device is advantageously arranged corresponding to a clock position of 6 o'clock, and two snap fastenings 13 are advantageously arranged on the circumference of the window unit (W) corresponding to a clock position of 10 and 2 o'clock.

16 Claims, 12 Drawing Sheets

WINDOW UNIT FOR AIRCRAFT CABINS

The invention relates to a window unit for aircraft cabins.

Known window units for aircraft cabins are connected in a fixed manner to the rearside of a side-wall panel. Since the inside window panes are generally made of acrylic and are susceptible to scratching, it is necessary to exchange them relatively frequently. In the case of conventional window units, the side-wall panel has to be removed for this purpose, and to do this it is furthermore often necessary in a costly manner to remove the seat rows. To avoid an outlay of this type, exchangeable windows have been installed in recesses in the side-wall panels. With constructions of this type, it turned out either to be relatively complex to install the window or that there was an insecure connection of the window in the side-wall panel. A further consequence was that there were also difficulties with using the sun-visors or roller blinds for covering the window panes to protect against the sun's rays.

The object of the invention is the provision of measures by means of which the installation and removal of a window unit can be carried out rapidly and simply, thereby making it possible for the window unit to be rapidly exchanged and for there to be easy access to the structural window panes arranged in the aircraft fuselage without it being necessary to remove the side-wall fairing of the aircraft cabin. The intention moreover is for the components of the window unit to likewise be exchanged rapidly and simply so that possible maintenance work can be carried out rapidly and inexpensively. The invention is furthermore intended to ensure that the window unit is securely connected to the side-wall panel or the like and that loose components, which may constitute sources of danger or at least sources of noise, are avoided. The intention moreover is to reduce the risk of willful or unconscious destruction of components of the window unit and to avoid, or at least reduce, the disadvantages of known systems.

To achieve the object, the invention makes provision for the window unit to have a centering device and at least two snap fastenings to detachably connect it to the side-wall panel or the like, or to components connected thereto, the side-wall panel or the like, or components connected thereto, having any necessary mating parts for the centering device and for the snap fastenings. This ensures that the entire window unit is precisely, rapidly and securely connected to the sidewall panel. It is not necessary to remove the side-wall panels or seat rows, and the exchange of the window units can hence be carried out rapidly, and thus expensive immobilization times of the aircraft can be reduced. Mating parts for the centering device and for the snap fastenings may also be omitted with an appropriate design of the centering device and of the snap fastenings as well as of the side-wall panel, or components connected thereto, in the region of the opening for the window unit.

In order to ensure that the window unit can be installed and removed in a convenient manner, the centering device is advantageously arranged on the lower side of the window unit corresponding to a clock position of 6 o'clock, and two snap fastenings are advantageously arranged on the circumference of the window unit corresponding to a clock position of 10 and 2 o'clock. During installation, the window unit is thus placed by the centering device obliquely with respect to the side wall panel into the possibly necessary mating part on the side-wall panel, and then tilted towards the side-wall panel, whereupon the snap fastenings latch into the mating parts on the side-wall panel or the like, or on components connected thereto, or directly into or behind the side-wall panel.

A simple design variant of the invention makes provision for the centering device to be formed by at least one preferably semicircular centering lug or the like which is preferably arranged on the lower edge of the covering frame or of the inner window frame and which can be placed into a corresponding, complementary indentation on the side-wall panel or the like, or on components connected thereto. The semicircular design of the centering lug reduces the risk of it or of the possible mating part on the side-wall panel or the like being damaged.

In order to achieve a secure connection between the window unit and side-wall panel, provision is made for the window unit to have devices for locking the snap fastenings, the connection thereby being prevented from being undone by vibrations or by unauthorized persons. In order to avoid loose components which may constitute a source of danger or at least a source of noise, all of the parts of the centering device and of the snap fastenings and also of the possible devices for locking the snap fastenings are advantageously in each case connected to another part. This prevents small parts from falling behind the side-wall panels during installation or removal and these small parts having to be laboriously looked for and removed.

According to an advantageous embodiment of the invention, each snap fastening is formed by a spring element connected to the window unit and the device for locking the snap fastening is formed by a securing element (24) which is mounted rotatably on the spring element and with which the snap fastening can be locked and released. This constitutes an inexpensive and efficient way of bringing about a snap fastening with an integrated locking device. The spring element is preferably formed by a steel spring.

When a rigid sun-visor is used, a further inventive feature provides a sun-visor guide which is connected to the side-wall panel or the like preferably via screws or the like and which has mating parts for the snap fastenings. The sun-visor guide thus serves simultaneously as a guide for the sun-visor and as a mating part for the snap fastenings. The sun-visor guide is fitted onto the invisible rear side of the side-wall panels before they are installed in the aircraft cabin.

In order also to make it possible for the components of the window unit, in particular of the window pane, to be rapidly and simply exchanged, according to a further inventive feature the outer window frame and the inner window frame are connected detachably to one another via at least three snap fastenings. The two window frames can rapidly be separated by maintenance personnel using an appropriate tool and the window pane lying in between can be exchanged, for example.

The snap fastenings are advantageously formed by hooks which are arranged on the inner window frame and can be snapped into corresponding slots in the outer window frame. Snap fastenings designed in this manner can be produced very cheaply in particular with the aid of injection-molding processes which are customary for producing the components of window units of this type in aircraft engineering.

For the simple exchange or simple installation of further components of the window unit, in particular of the sun-visor, the roller blind or the like, the invention furthermore makes provision for the covering frame and the outer window frame to be connected detachably to one another via at least three fastenings. The covering frame can thus be rapidly separated from the unit comprising the inner and outer window frames and window pane lying in between them by maintenance personnel using an appropriate tool, and the component parts, in particular the sun-visor or the like, which is more susceptible to damage, can be exchanged.

According to an advantageous design variant, the covering frame and the outer window frame are connected detachably to one another via at least two bayonet-type fastenings and at least one snap fastening. This constitutes a secure variant of the connection which is simple to produce.

Further features are explained in more detail with reference to the drawings in which an exemplary embodiment of the window unit according to the invention and its fastening to the side-wall panel is illustrated.

For ease of understanding in several drawings, the side which is outside the aircraft interior is marked in each case by "O" (outboard) and the side of the aircraft cabin is in each case marked by "I" (inboard).

Figure 1:
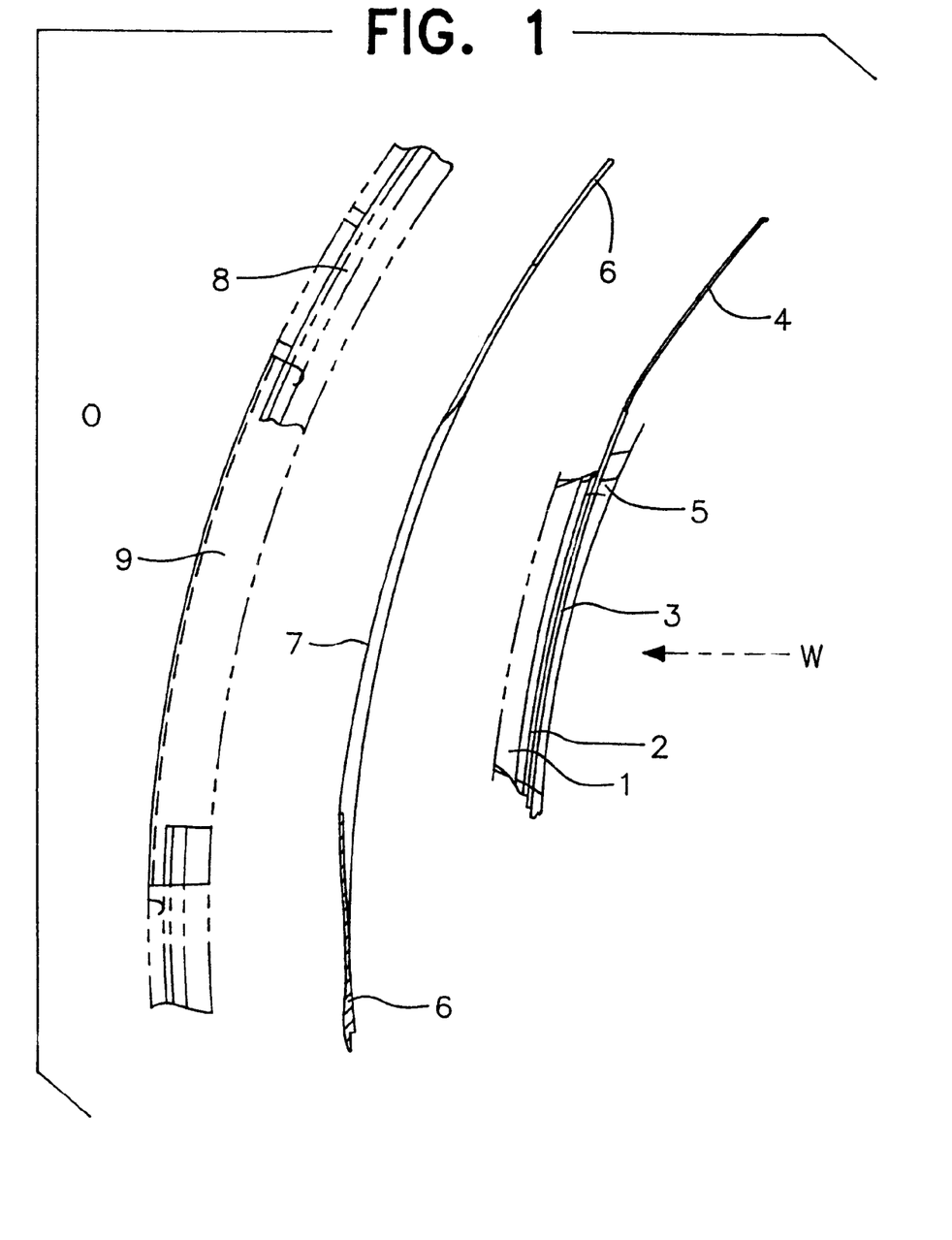
FIG. 1 shows a section through part of an aircraft fuselage in the region of a window pane.

FIG. 1 illustrates part of an aircraft fuselage in the region of a window. The window unit W comprises an outer window frame 1, a window pane 2, an inner window frame 3 and possibly a sun-visor 4 arranged between the inner window frame 3 and a covering frame 5. A roller blind or the like (not shown) may also be used in place of the sun-visor 4. In the window unit W sun protection of this type may also be completely dispensed with. In such a case, the covering frame 5 may be dispensed with, or the inner frame 3 may be designed in the form of the covering frame 5. According to the invention, the window unit W is connected detachably to a sidewall panel 6, which serves to form the aircraft interior. For this purpose, there is located in the side-wall panel 6 a corresponding opening 7 into which the window unit W can be inserted. Behind the side-wall panel 6 is located the outer wall 8 of the aircraft with correspondingly arranged structural window panes 9. The structural window panes 9 have to withstand the great difference in pressure between the aircraft cabin I and the outside O of the aircraft and, to this end, they are generally made of quartz glass. In contrast, the window pane 2 of the window unit W is generally made from acrylic in planar form and bent by the window frame 1, 3 which is curved to correspond to the fuselage.

Figure 2:
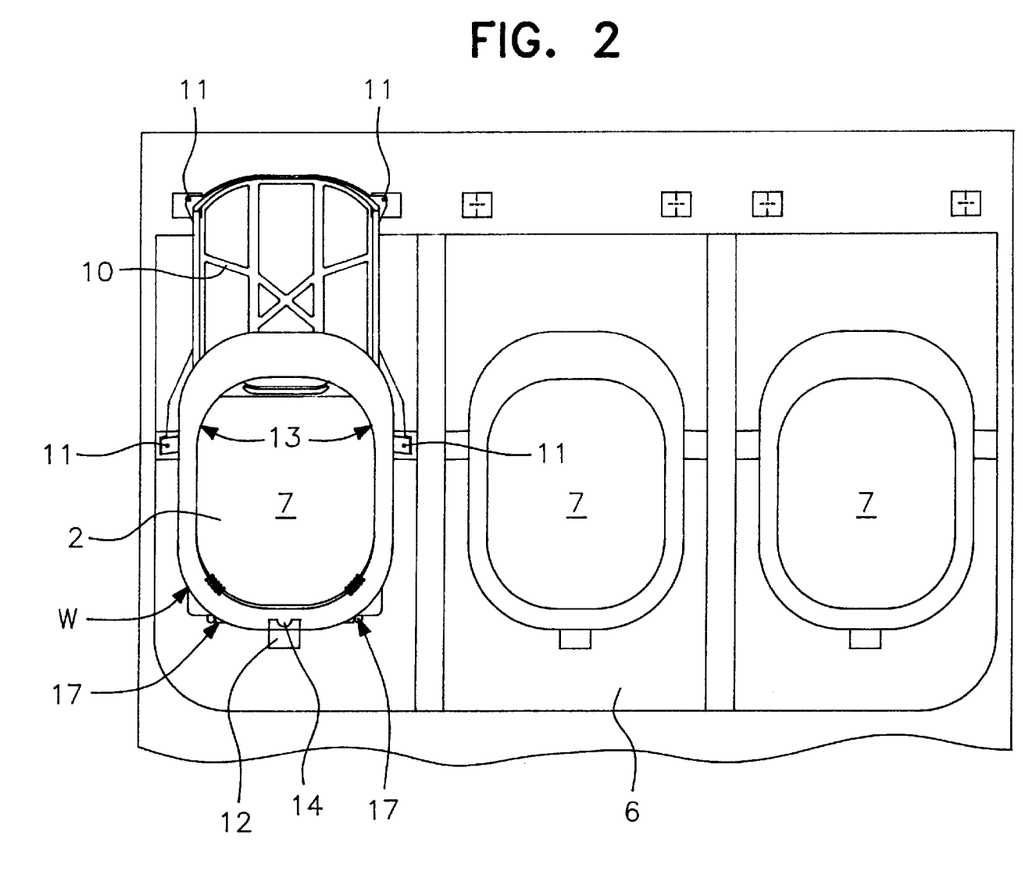
FIG. 2 shows a view of part of the side-wall fairing from the outside in the direction of the aircraft cabin.

FIG. 2 shows a side-wall panel 6 for accommodating three window units W, in the view from the outside O in the direction of the aircraft cabin I. Above the left-hand opening 7 in the side-wall panel 6 a sun-visor guide 10 is connected to the side-wall panel 6 via four screws 11 or the like. In addition to the task of guiding a sun-visor 4 of the window unit W, the sun-visor guide 10, when installed, also has the possibly necessary components for connecting the window unit W to the side-wall panel 6. According to the invention, the window unit W has at least one centering device and at least two snap fastenings 13. The sun-visor guide 10 contains the possibly necessary mating parts of the snap fastenings 13 on the window unit W. These could, of course, also be provided directly on the side-wall panel 6. The mating part, which is shaped in a complementary fashion to the centering device of the window unit W, is formed on the side-wall panel 6. In the embodiment which is illustrated, the centering device is a centering lug 12 in the form of a semicircular shaped portion on the lower side (corresponding to a clock position of 6 o'clock) of the window unit W, which is arranged on the covering frame 5, and is a semicircular indentation 14, which is formed in a complementary fashion to the centering lug 12, on the lower edge of the opening 7 in the side-wall panel 6. Two tabs 17 are arranged on both sides of the centering lug 12, which tabs serve, on the one hand, to connect the covering frame 5 to the outer window frame 1 and, on the other hand, as a lower stop for the sun-visor 4. The sun-visor guides 10, which are necessary in the given case to connect the window unit W to the side-wall panel 6, are connected to the side-wall panels 6 before they are installed in the aircraft cabin.

Figure 3:
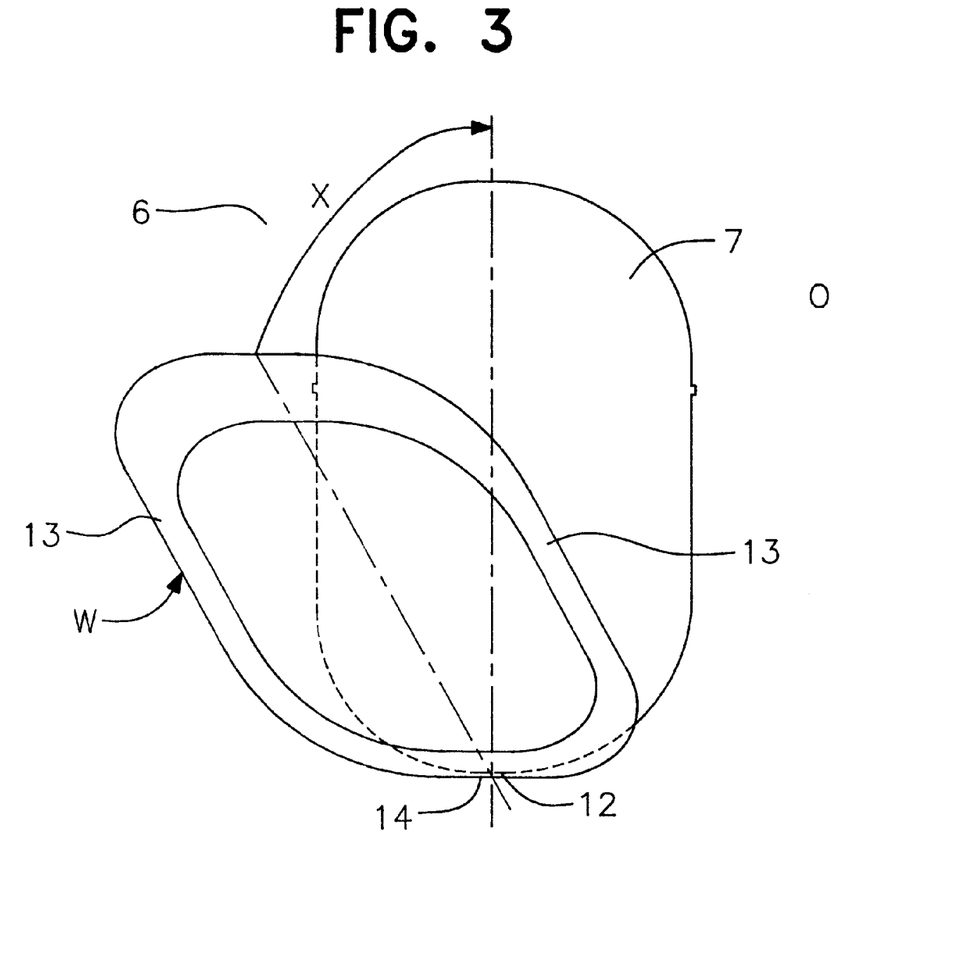
FIG. 3 shows a perspective schematic diagram to illustrate the installation of the window unit in the opening in a side-wall panel.

FIG. 3 illustrates the principle of installing the window unit W in an opening 7 in the side-wall panel 6. For installation the window unit W is placed obliquely with respect to the side-wall panel 6 by the centering lug 12 into a correspondingly complementarily configured element 14 on the lower edge of the opening 7 in the side-wall panel 6, and then tilted towards the side-wall panel 6 in the direction of the arrow X. The two snap fastenings 13 serve for the detachable connection of the window unit W to the side-wall panel 6, or to elements connected thereto. In addition, devices for locking the snap fastenings may be provided. The window unit W can also be removed again just as easily and rapidly by any locks being released and the snap fastenings 13 being opened and the window unit W being pivoted forward and removed counter to the direction of the arrow X.

Figure 4:
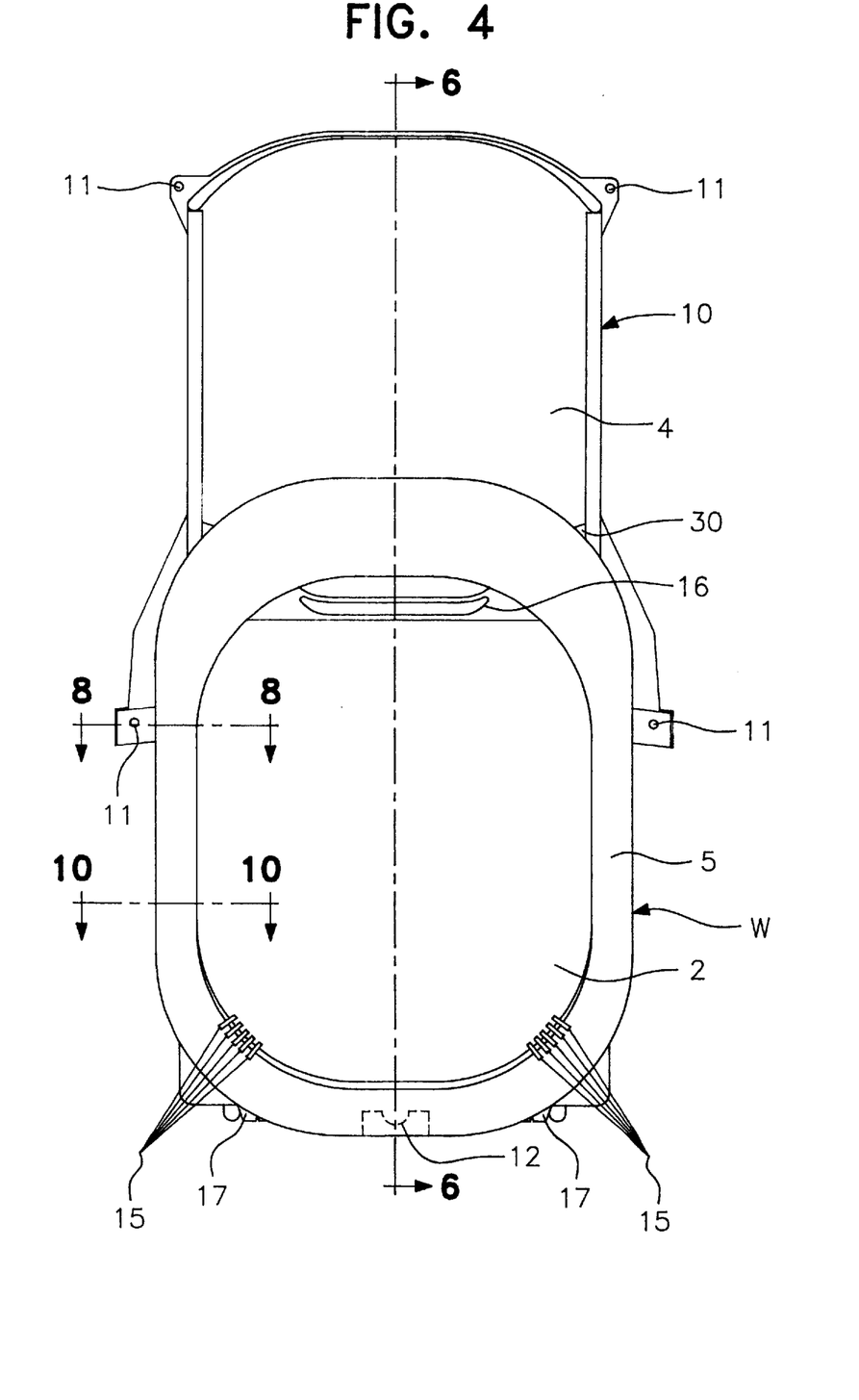
FIG. 4 shows a view of a window unit and a sun-visor guide from the aircraft cabin.

FIG. 4 illustrates a window unit W and a sun-visor guide 10 as seen from the aircraft cabin I. The window pane 2 may have ventilation holes 15 of a certain diameter and in a certain number. On the rearside of the covering frame 5 the centering device is provided in the form of a centering lug 12 (shown by dashed lines) in the middle of the lower edge of the window unit W, and tabs 17, which are arranged on both sides of the centering lug 12, are provided. The centering lug 12 and the tabs 17 are advantageously produced together with the covering frame 5 in a single operation, usually by a thermoplastic injection molding procedure. Above the window unit W is shown the sun-visor guide 10 which is normally connected to the side-wall panel 6 (not illustrated here) with the aid of screws 11 or the like. The sun-visor 4 is guided in the sun-visor guide 10 in a manner such that the sun-visor 4 can essentially move only in the vertical direction. At the same time, it has to be possible, on the one hand, for the sun-visor 4 to be easily displaced and, on the other hand, for it to be held in any position. The lower part 30 of the sun-visor 4 is made of a harder material than the rest of the sun-visor 4 and also includes a handle 16 for manual displaceability of the sun-visor 4. In the region of the two lower screws 11 or the like of the sun-visor guide 10 there are provided the snap fastenings 12 (which cannot be seen) for detachably connecting the window unit W to the side-wall panel or the sun-visor guide 10.

Figure 5:
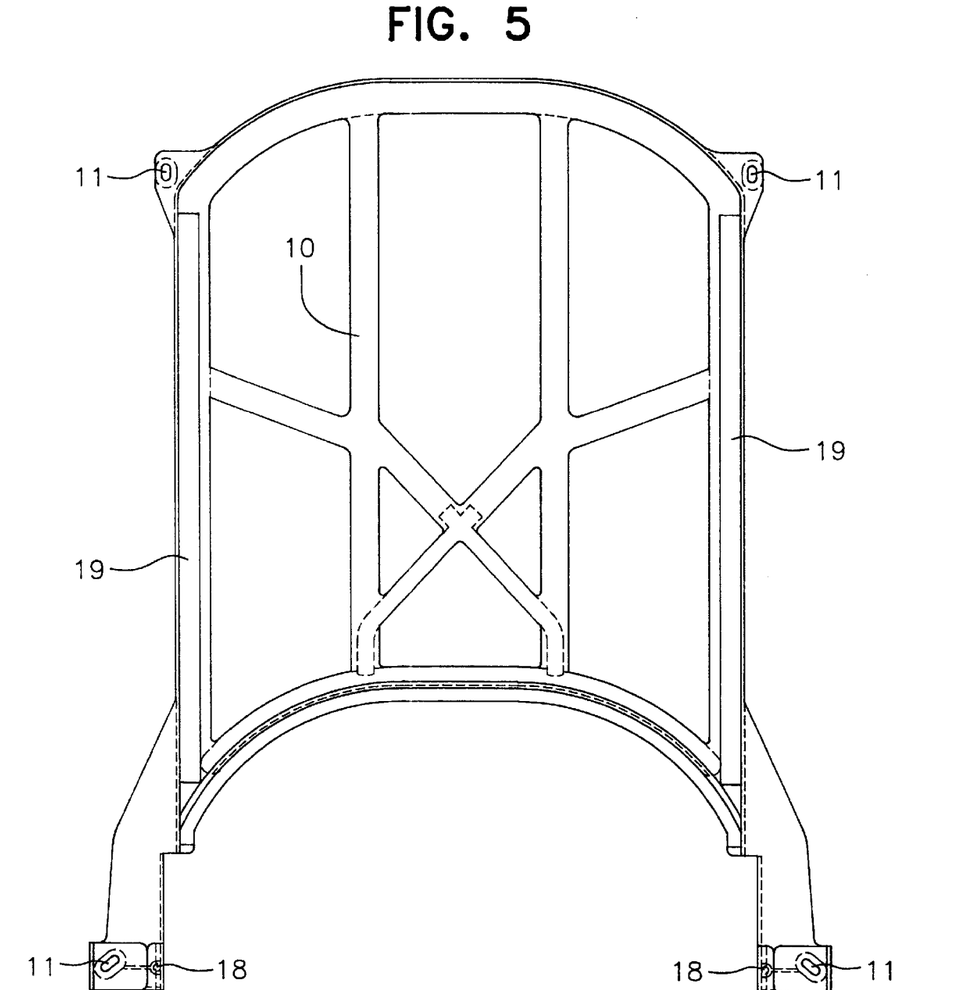
FIG. 5 shows a view of the sun-visor guide from the aircraft cabin.

FIG. 5 shows a view of the sun-visor guide 10 which, for reasons of saving on material and hence on weight, can be constructed like a trellis. Guide rails 19 are arranged at the sides to guide the sun-visor 4. In the region of the two lower screws 11, positioning devices 18 are provided, which positioning devices engage into corresponding mating parts on the side-wall panel 6 and serve to precisely position the sun-visor guide 10 on the side-wall panel 6. In consequence, this also ensures a precise positioning of the window unit W in the opening 7 in the side-wall panel 6.

Figure 6:
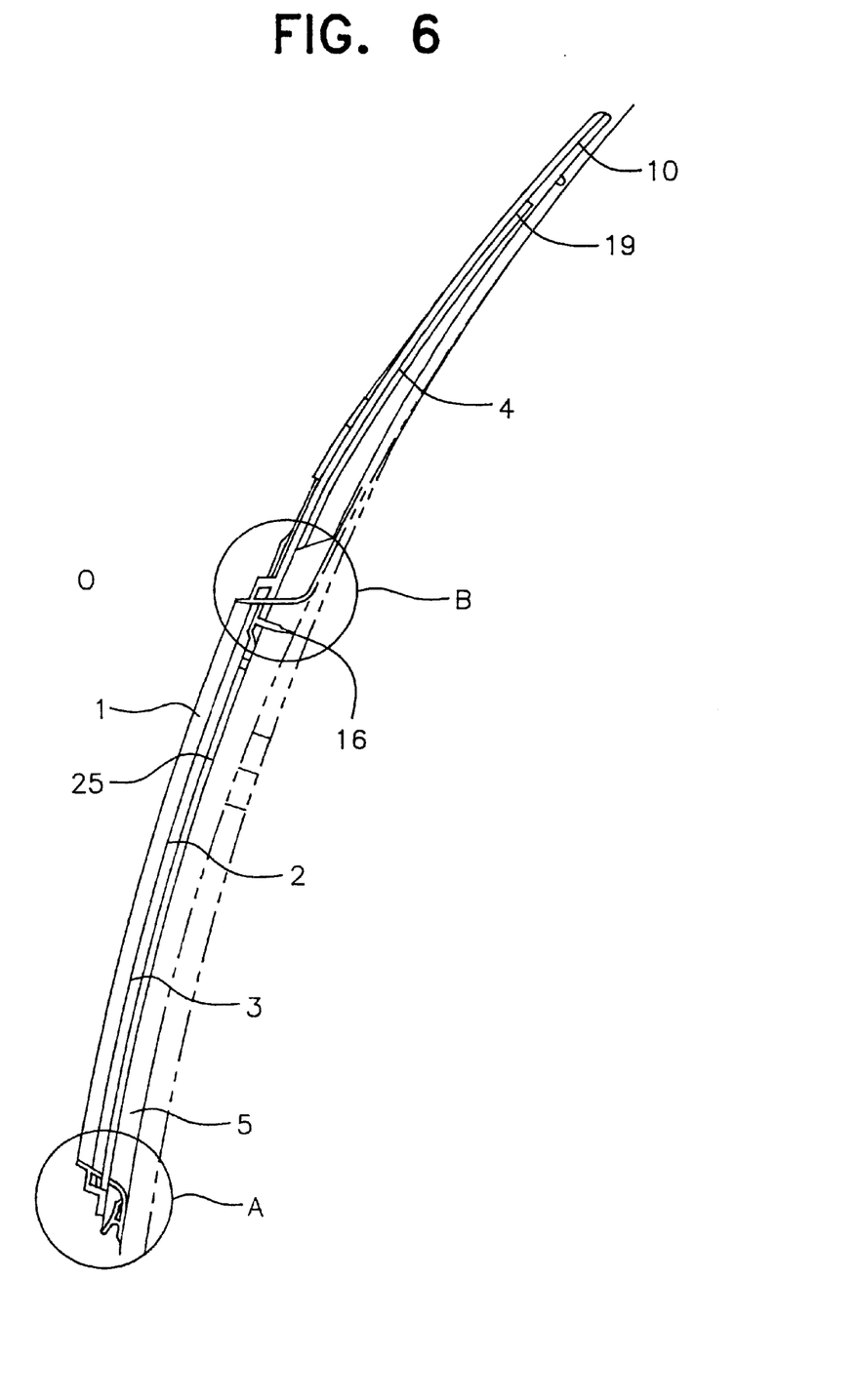
FIG. 6 shows a section through the window unit according to FIG. 4 along the intersecting line VI—VI.

FIG. 6 illustrates a section through the window unit W according to FIG. 4 along the intersecting line VI—VI from which the curvature of the window unit W corresponding to the shape of the aircraft interior can be seen. The window pane 2 is forcibly made to curve due to being fixed between the outer window frame 1 and the inner window frame 3. The sun-visor 4, which can be displaced via the handle 16, is arranged between the inner window frame 3 and the covering frame 5. Details A and B are illustrated on an enlarged scale in FIGS. 11 and 12. The sectional illustration also reveals the hexagon socket 25 of the securing element of a snap fastening, which socket is described further below.

Figure 7:
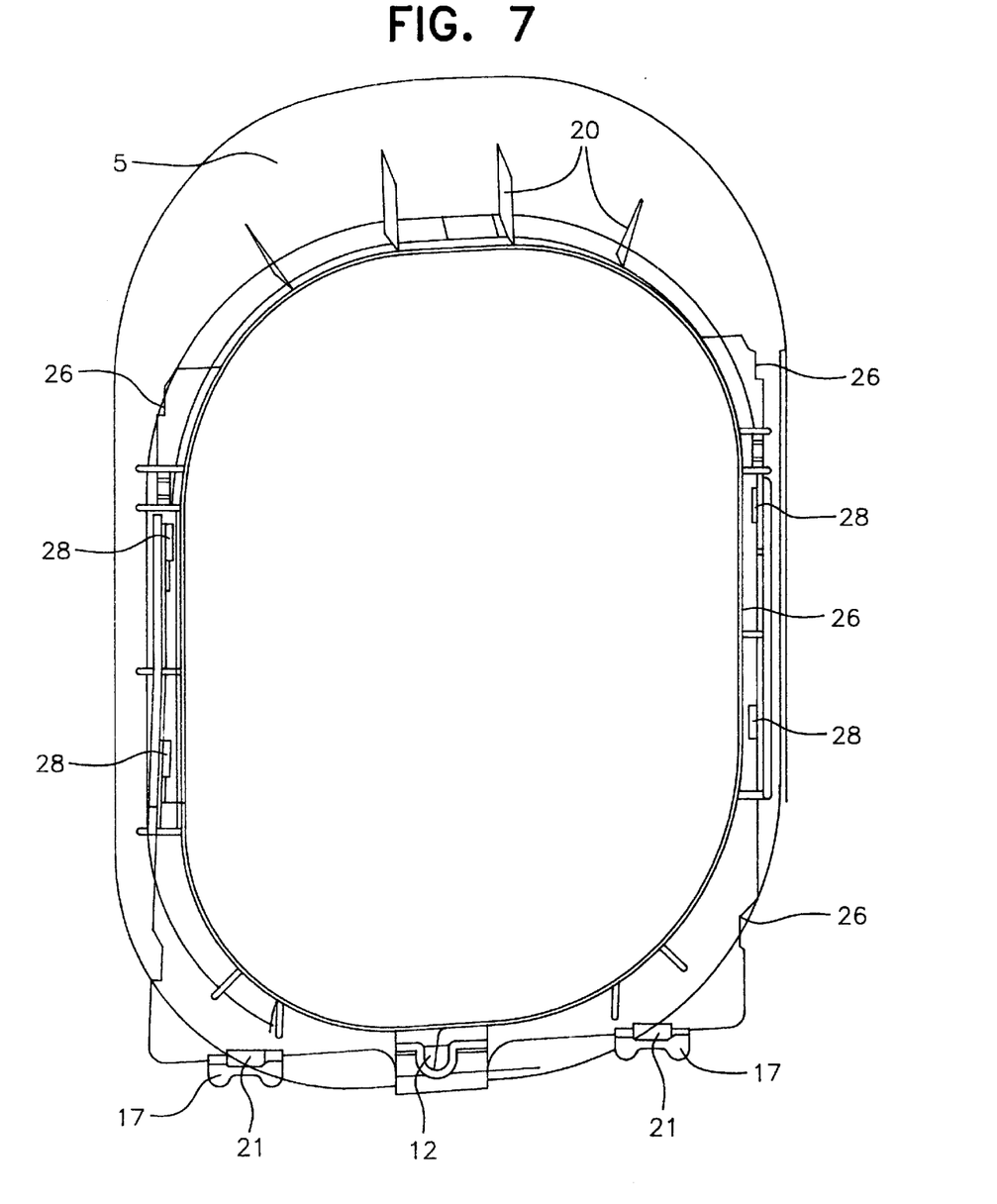
FIG. 7 shows a perspective view of a covering frame of a window unit from the outside.

The perspective view of the covering frame 5 of a window unit W, as seen from the outside O according to FIG. 7, gives a better view of the centering device in the form of a centering lug 12. Two tabs 17 are arranged on both sides of the centering lug 12, which tabs have an opening 21 into which snap-in hooks of the outer window frame 1 engage (cf. further below). The tabs 17 also constitute a lower stop for the sun-visor 4. To increase the strength reinforcing ribs 20 are arranged on the covering frame 5, which reinforcing ribs can easily be allowed for in particular when production is by injection molding. There can also be seen the guide strips 26 for the sun-visor 4 and the slots 28 for the bayonet-type fastenings of the outer window frame 1, which are likewise described further below.

Figure 8:
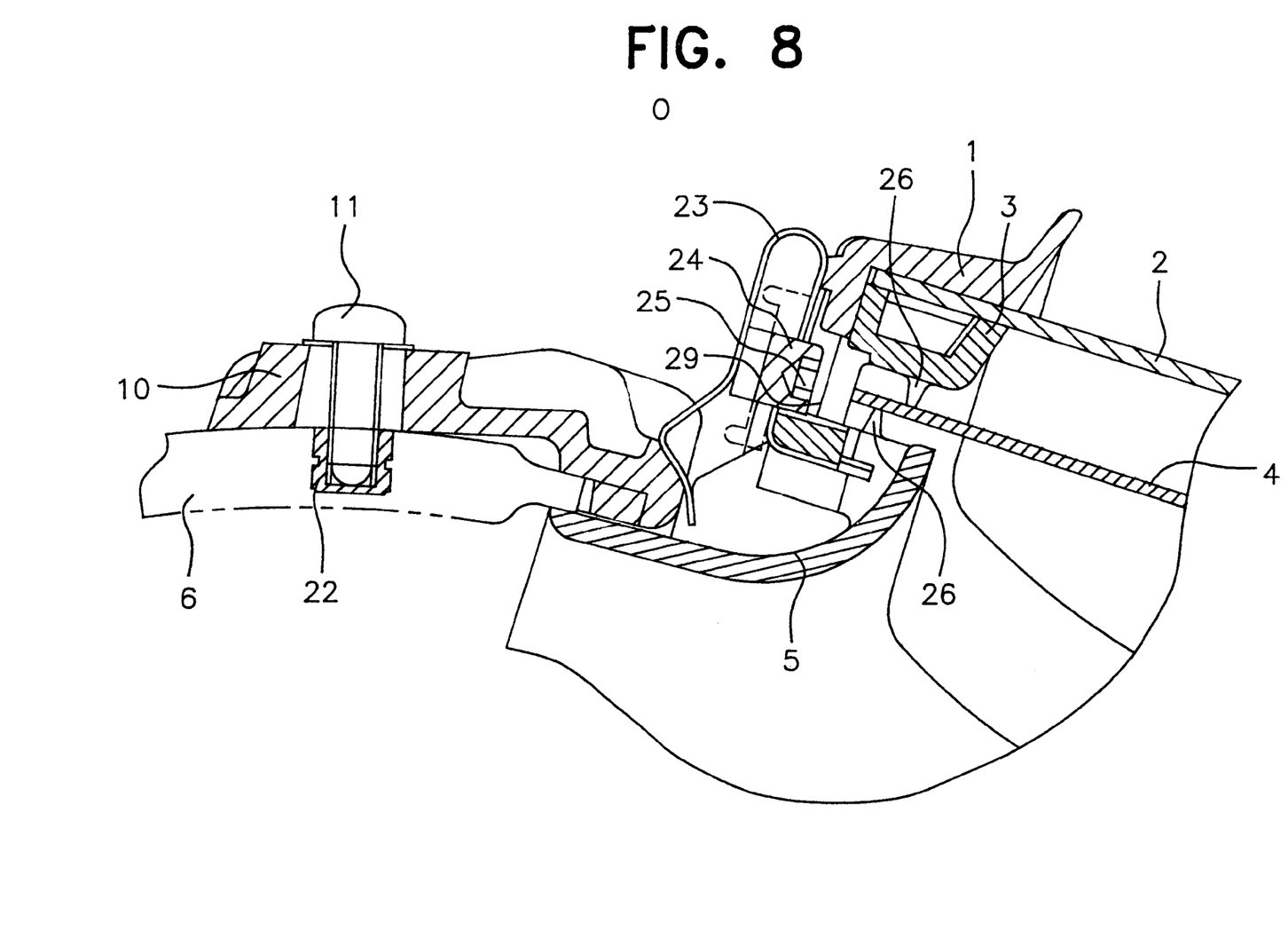
FIG. 8 shows a section through the window unit according to FIG. 4 along the intersecting line VIII—VIII.
Figure 9:
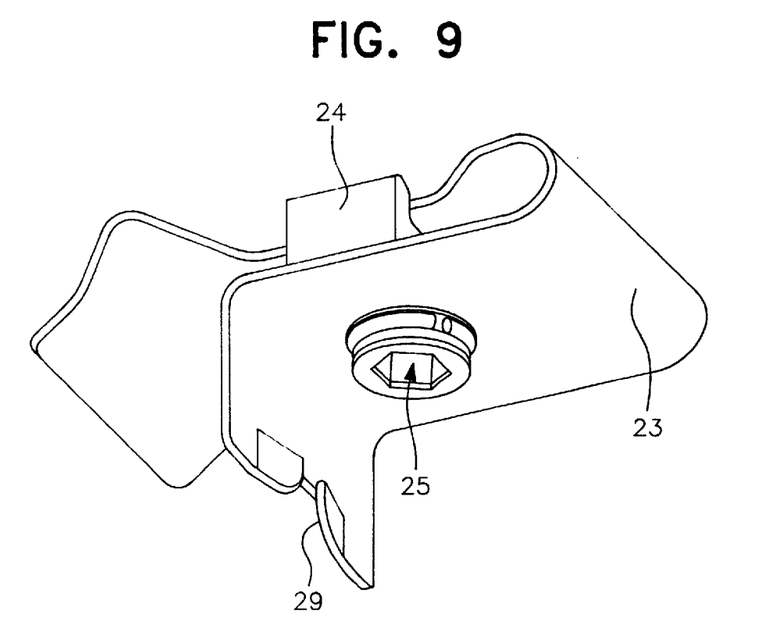
FIG. 9 shows a perspective view of the snap fastening according to FIG. 8.

FIG. 8 shows a section through the window unit W according to FIG. 4 along the intersecting line VIII—VIII. The sun-visor guide 10 is fixed to the side-wall panel 6 via screws 11 which engage, for example, into threaded inserts 22 which are glued into the side-wall panel 6. It is also possible for the sun-visor guide 10 to be bonded directly to the side-wall panel 6 or for the side-wall panel 6 itself to be designed in the form of the sun-visor guide 10. On the covering frame 5 is arranged the snap fastening 13 in the form of a spring element 23, preferably a steel spring. To fasten it the spring element 23 is provided, for example, with a barb 29 at the appropriate point (cf. FIG. 9), which barb engages into a suitable cut-out on the covering frame 5. When the window unit W is tilted into the opening 7 in the side-wall panel 6, the flat region of the spring element 23 is first passed over before the end of the spring element 23 is compressed and then latches into a corresponding mating part of the sun-visor guide 10 or behind the wall of the sun-visor guide 10. To lock the snap fastening 13, a securing element 24 is mounted rotatably on the spring element 23, the rotation being able to be completed by a tool which can be inserted into an appropriate opening, for example a hexagon socket 25. As can better be seen in FIG. 9, the securing element 24 is designed in the form of two opposite hooks which in the position illustrated in FIG. 9 are placed outside the region of the spring element 23, thereby enabling the spring element 23 to be deformed. In a position pivoted with respect thereto through 90°, which is shown by dashed lines in FIG. 8, the hooks of the securing element 24 bear against the inside of the spring element 23 and, as a result, the latter is blocked and the window unit W cannot be removed from the side-wall panel 6. The end positions can be fixed by stops. The opening of the securing element 24, for example the hexagon socket 25, cannot be seen since it is arranged behind the guide groove for the sun-visor 4. This concealed position of the hexagon socket 25 of the securing element 24 to a very large extent prevents opening of the fastening of the window unit W to the side-wall panel 6 by unauthorized persons. For locking and release the sun-visor 4, which is mounted displaceably between two guide strips 26, is brought into the topmost, i.e. opened position, and the hexagon socket 25 of the securing element 24 thus becomes accessible and can be rotated with the aid of an appropriate tool so that the window unit W can be locked or released. By virtue of the precise guiding of the sun-visor 4 in the guide strips 26 the sun-visor 4 is unable to be so easily pulled willfully out of the guide, which was frequently the case in conventional window units.

Figure 10:
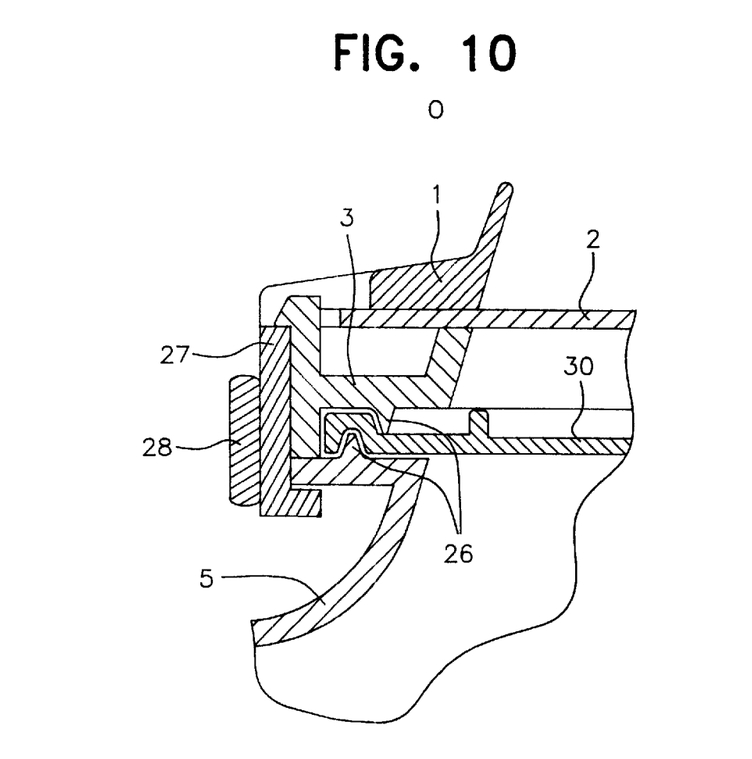
FIG. 10 shows a section through the window unit according to FIG. 4 along the intersecting line X—X.

FIG. 10 shows a section through the window unit W according to FIG. 4 along the intersecting line X—X. This illustration reveals part of the connection according to the invention between the outer window frame 1 and covering frame 5 which is formed, in the exemplary embodiment illustrated, by four bayonet-type fastenings and two snap fastenings. The bayonet-type fastenings are formed on the outer window frame 1 by hooks 27 which project into corresponding slots 28 in the covering frame 5. As can be seen at the position of the slots 28 in the covering frame 5 according to FIG. 7, two bayonet-type fastenings are in each case arranged on the vertical sides of the window unit W. The bayonet-type fastenings serve to position the outer window frame 1 together with the window pane 2 and inner window frame 2 [sic] in the covering frame 5. To secure the bayonet-type fastenings there are arranged on the lower side two snap fastenings which are formed on the outer window frame 1 by corresponding hooks which engage into corresponding openings 21 in the covering frame 5. The sectional illustration also shows the lower part 30 of the sun-visor 4 which is designed appropriately so as to give a precise guide between the guide strips 26 on the inner window frame 3 and on the covering frame 5. The corresponding guide enables the sun-visor 4 to be fixed in any desired position.

Figure 11:
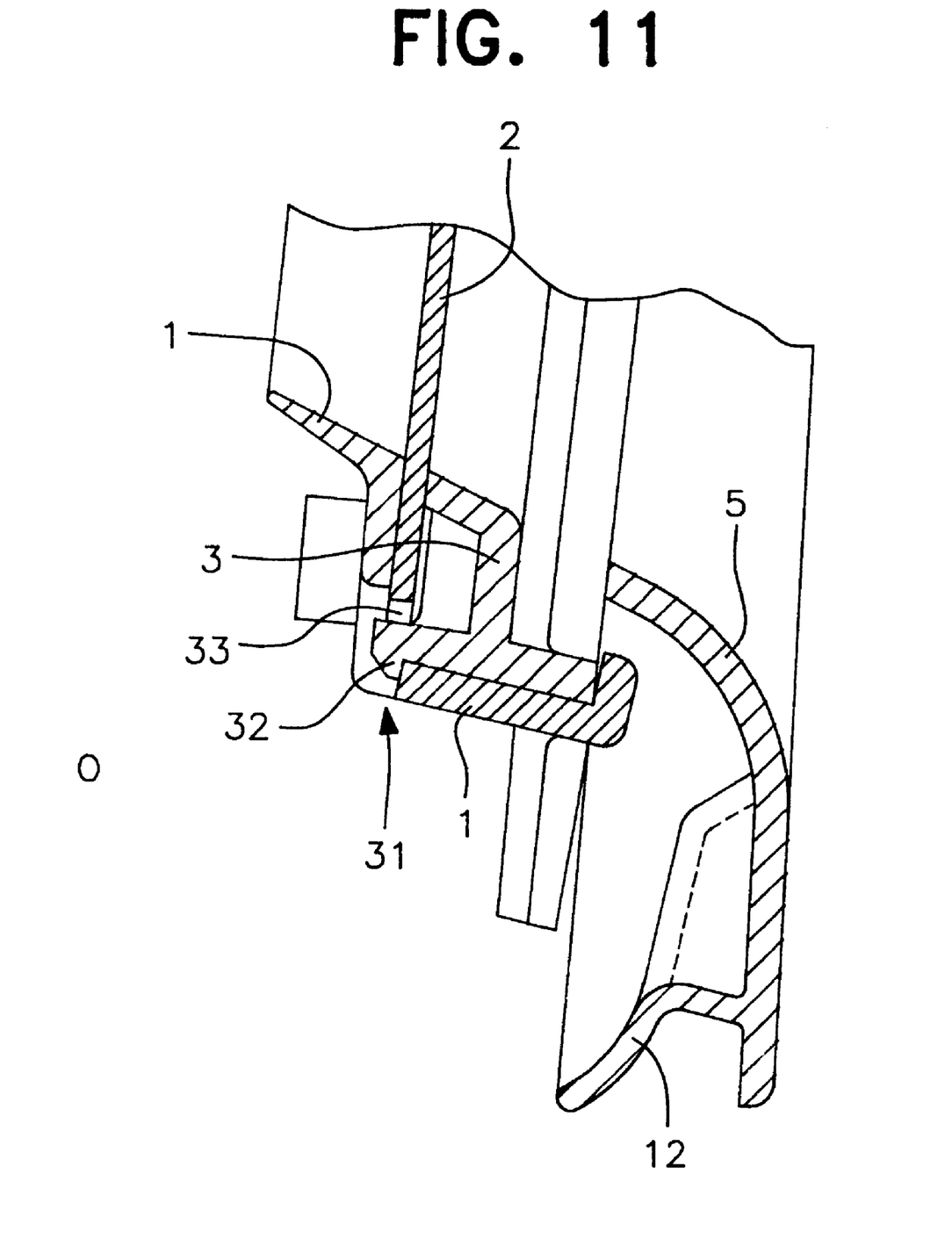
FIG. 11 shows an enlarged representation of the detail A from FIG. 6.

FIG. 11 shows the detail A of FIG. 6 in an enlarged representation. The outer window frame 1 and the inner window frame 3 are, according to the invention, likewise connected by a group of snap fastenings of which one snap fastening 31 can be seen in this sectional view. In the embodiment shown the snap fastening 31 consists of a hook 32 which is fixed on the inner window frame 3 or, preferably, is produced together with the latter in one manufacturing step, and which can be inserted through a slot 33 in the outer window frame 1 and in so doing is elastically deformed. If the hook 32 is completely inserted into the slot 33 it snaps in and forms a secure connection between the two window frames 1, 3. For a secure connection, at least three, preferably six snap fastenings are distributed along the circumference of the window unit W. The snap fastenings may, of course, have any other design. The connection of the outer window frame 1 to the inner window frame 3 enables the window pane 2 to be held in position in between. It is theoretically possible for the unit, comprising the outer window frame 1, the window pane 2 and inner window frame 3, to be integrally produced, for example from acrylic, in which case the entire unit 1, 2, 3 would have to be exchanged when changing the window pane 2. Finally, the centering lug 12, which is arranged on the covering frame 5, can also be seen in this figure.

Figure 12:
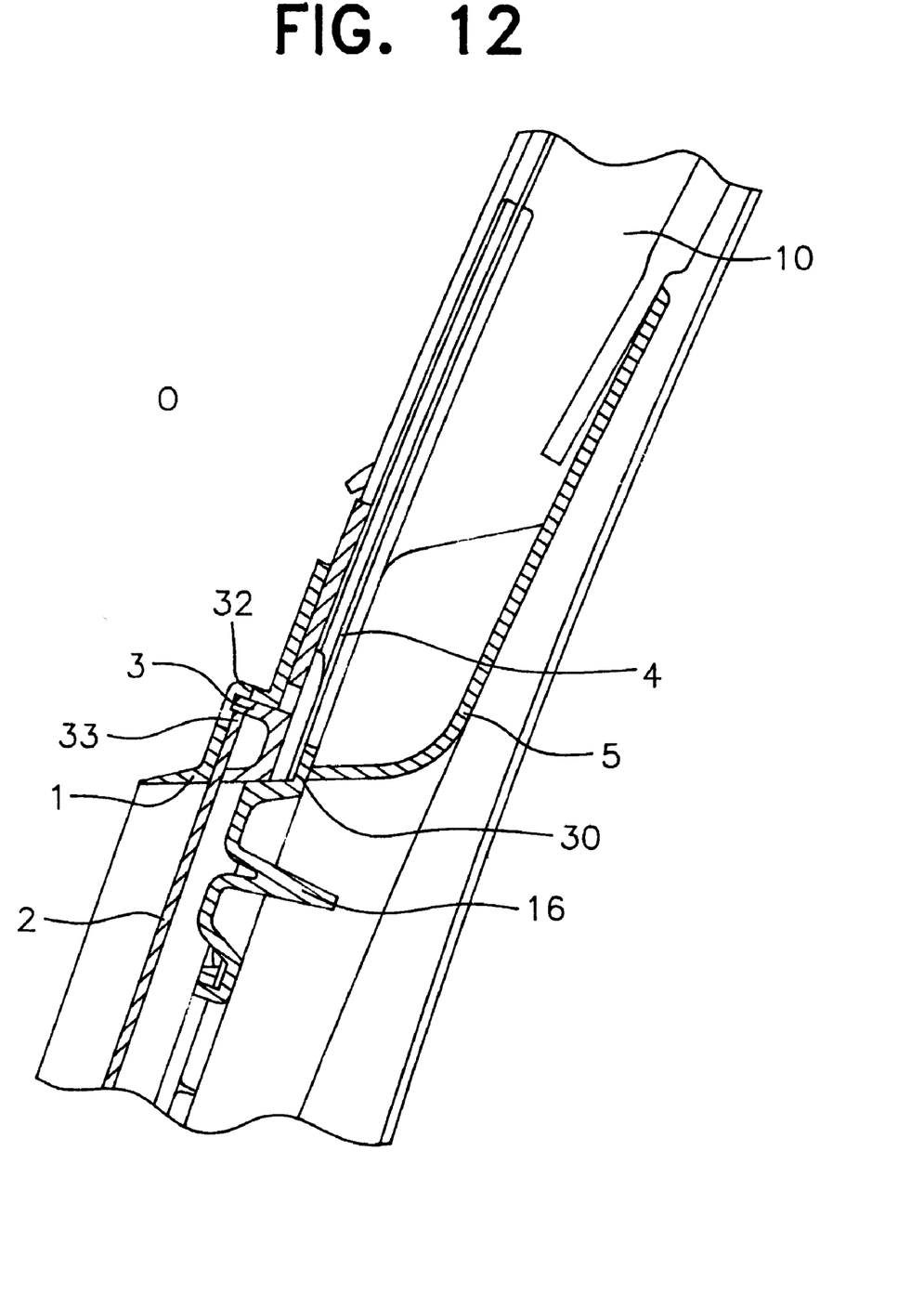
FIG. 12 shows an enlarged representation of the detail B from FIG. 6.

FIG. 12 illustrates the detail B of FIG. 6 on an enlarged scale, there also being revealed here a snap fastening for connecting the outer window frame 1 to the inner window frame 3, which comprises a hook 32 which is fixed on the inner window frame 3 or is produced integrally therewith and snaps into a slot 33 in the outer window frame 1. Moreover, the figure shows the handle 16 of the sun-visor 4, which is located here in the uppermost position. The lower part 30 of the sun-visor 4 is appropriately shaped together with the handle 16 so as to give better maneuverability. Part of the sun-visor guide 10 can be seen in the upper part of the figure.

Figure 13:
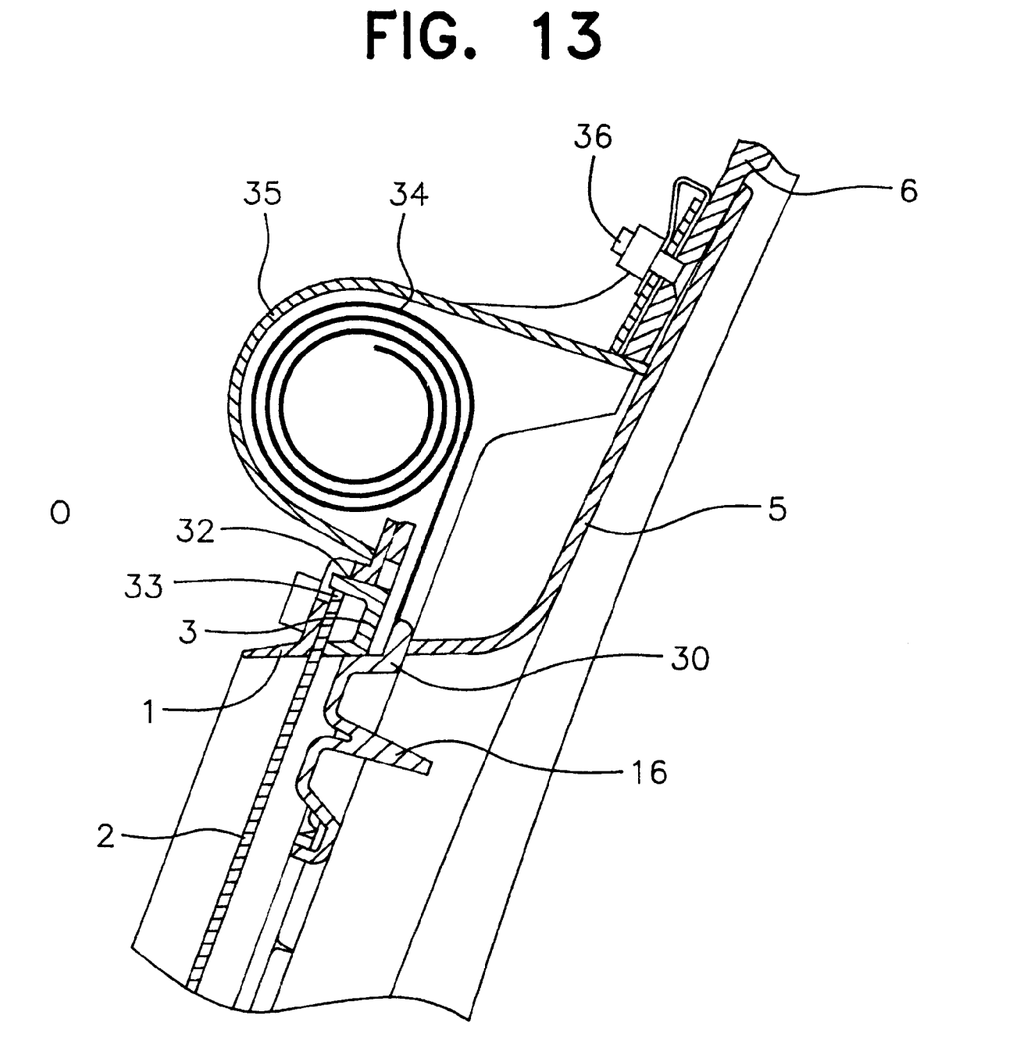
FIG. 13 shows the detail according to FIG. 12 in another embodiment.

FIG. 13 shows a modification of FIG. 12 with the use of a roller blind 34 instead of a rigid sun-visor 4, as is necessary or expedient in many applications. To protect the roller blind 34 there is provided a covering 35 which is fastened to the side-wall panel 6, for example with the aid of a connecting screw 36.

The outer and inner window frames 1, 3, the covering frames and any other components of the window unit W are preferably made of thermoplastic and are produced by injection molding. This makes possible inexpensive production with simultaneous implementation of the elements necessary for the connecting elements.

Of course, within the scope of the invention it is possible for various constructional modifications to be undertaken and, in particular, for the number and arrangement of the various connecting units (snap fastenings, bayonet-type fastenings) to be changed and matched optimally to the particular application.

We claim:

1. Window unit (W) for an aircraft having a cabin, a hull and a pressure window component, comprising: an outer window frame (1), an inner window frame (3), a window pane (2) lying between the outer window frame (1) and the inner window frame (3), the window unit (W) being insertable into an opening (7) in a side-wall panel (6) in the aircraft cabin, the window unit (W) having a centering device and at least two snap fastenings (13) to detachably connect the window unit (W) to the side-wall panel (6) or to components connected thereto, the side-wall panel (6) or components connected thereto having any necessary mating parts for the centering device and for the at least two snap fastenings (13), said connection of the window unit (W) to the side-wall panel, or components connected thereto, being independent of said hull or pressure window component.

2. Window unit according to claim 1, wherein the centering device is arranged on a lower side of the window unit (W) corresponding to a clock position of 6 o'clock, and two snap fastenings (13) are arranged on the circumference of the window unit (W) corresponding to a clock position of 10 and 2 o'clock.

3. Window unit according to claim 1, wherein the centering device is formed by at least one centering lug (12) which is arranged on a lower edge of the inner window frame (3) and which can be placed into a corresponding, complementary indentation (14) on the side-wall panel (6) or on components connected thereto.

4. Window unit according to claim 1, wherein the window unit (W) has devices for locking the snap fastenings (13).

5. Window unit according to claim 1, wherein all of the parts of the centering device and of the snap fastenings (13) are in each case connected to another part.

6. Window unit according to claim 5, wherein each snap fastening (13) is formed by a spring element (23) connected to the window unit (W), and further comprising a device for locking the snap fastening (13) formed by a securing element (24) which is mounted rotatably on the spring element (23) and with which the snap fastening can be locked and released.

7. Window unit according to claim 1, further comprising a sun-visor guide (10) which is connected to the side-wall panel (6) and has corresponding mating parts for the snap fastenings (13).

8. Window unit according to claim 1, wherein the outer window frame (1) and the inner window frame (3) are connected detachably to one another via at least three snap fastenings (31).

9. Window unit according to claim 8, wherein the snap fastenings (31) are formed by hooks (32) which are arranged on the inner window frame (3) and can be snapped into corresponding slots (33) in the outer window frame (1).

10. Window unit according to claim 1, wherein the covering frame (5) and the outer window frame (1) are connected detachably to one another via at least three fastenings.

11. Window unit according to claim 10, wherein the covering frame (5) and the outer window frame (1) are connected detachably to one another via at least two bayonet-type fastenings (27, 28) and at least one snap fastening.

12. Window unit according to claim 1, further comprising a sun-visor (4).

13. Window unit according to claim 1, further comprising a roller blind (34).

14. Window unit according to claim 13, further comprising a covering frame (5), the roller blind (34) being arranged between the inner window frame (3) and the covering frame (5).

15. A window unit for an aircraft cabin comprising an outer window frame, an inner window frame, a window pane lying between said outer window frame and said inner window frame, a roller blind, and a covering frame, the roller blind being arranged between said inner window frame and said covering frame, said window unit being insertable into an opening in a side-wall panel in the aircraft cabin, the window unit having a centering device and at least two snap fastenings to detachably connect the window unit to the side-wall panel or to components connected thereto, the side-wall panel or components connected thereto having any necessary mating parts for the centering device and for the at least two snap fastenings.

16. A window unit for an aircraft having a side-wall panel, a hull and pressure window component, comprising: an outer window frame, an inner window frame, a window pane lying between the outer window frame and the inner window frame, said window unit being removably inserted into an opening in said side-wall panel from an interior side of said aircraft, said window unit further including a centering device and at least two snap fastenings to detachably connect the window unit to the side-wall panel, said side-wall panel having mating parts for the centering device and for the at least two snap fastenings, said window unit being connected to the side-wall panel without direct connection between said window unit and said hull or said pressure window component.

* * * * *